US006743302B2

(12) United States Patent
Cuyler et al.

(10) Patent No.: US 6,743,302 B2
(45) Date of Patent: Jun. 1, 2004

(54) DRY-IN-PLACE ZINC PHOSPHATING COMPOSITIONS INCLUDING ADHESION-PROMOTING POLYMERS

(75) Inventors: Brian B. Cuyler, Oxford, MI (US); Bruce H. Goodreau, Romeo, MI (US); Robert W. Miller, Oakland, MI (US); Thomas J. Prescott, Troy, MI (US)

(73) Assignee: Henkel Corporation, Gulph Mills, PA (US)

( * ) Notice: Subject to any disclaimer, the term of this patent is extended or adjusted under 35 U.S.C. 154(b) by 0 days.

(21) Appl. No.: 09/769,128

(22) Filed: Jan. 24, 2001

(65) Prior Publication Data

US 2002/0007872 A1 Jan. 24, 2002

Related U.S. Application Data

(60) Provisional application No. 60/245,694, filed on Nov. 3, 2000, and provisional application No. 60/178,685, filed on Jan. 28, 2000.

(51) Int. Cl.⁷ .............................................. C23C 22/00
(52) U.S. Cl. ..................... 148/251; 148/257; 148/262; 106/14.12; 252/389.2
(58) Field of Search ................................ 148/251, 257, 148/262; 106/19.12; 252/389.2

(56) References Cited

U.S. PATENT DOCUMENTS

| | | | |
|---|---|---|---|
| 3,837,928 A | 9/1974 | Morrison ................ | 148/6.15 Z |
| 4,264,378 A | 4/1981 | Oppen et al. ........... | 148/615 R |
| 4,659,395 A | 4/1987 | Sugama et al. ......... | 148/6.15 Z |
| 5,061,315 A | 10/1991 | Collier et al. ............ | 106/14.05 |
| 5,063,089 A | 11/1991 | Lindert et al. .............. | 427/354 |
| 5,068,299 A | 11/1991 | Lindert et al. .............. | 526/313 |
| 5,232,523 A * | 8/1993 | Endo et al. ................. | 148/251 |
| 5,266,410 A | 11/1993 | Lindert et al. .............. | 428/461 |
| 5,298,289 A | 3/1994 | Lindert et al. ........... | 427/388.4 |
| 5,378,292 A | 1/1995 | Miller et al. ................. | 148/259 |
| 5,494,535 A | 2/1996 | Keller et al. ................. | 148/251 |
| 5,604,040 A | 2/1997 | Sugama .................. | 428/472.3 |
| 5,891,952 A | 4/1999 | McCormick et al. ........ | 524/596 |
| 6,020,029 A | 2/2000 | Ferrier et al. ............... | 427/333 |
| 6,117,251 A | 9/2000 | Rivera ......................... | 148/251 |

FOREIGN PATENT DOCUMENTS

| | | |
|---|---|---|
| CA | 2309581 | 5/1999 |
| EP | 0385806 | 9/1990 |
| WO | 97 17480 | 5/1997 |
| WO | 97 45568 | 12/1997 |

OTHER PUBLICATIONS

Translation of WO 97/45568 (supplied in IDS by applicant), Dec. 1997.*

* cited by examiner

*Primary Examiner*—Andrew L. Oltmans
(74) *Attorney, Agent, or Firm*—Stephen D. Harper; Mary K. Cameron

(57) ABSTRACT

Excellent adhesion to subsequently applied paint or elastomer is obtained by coating a metal substrate with a phosphate conversion coating by contact with a liquid phosphating solution that contains zinc cations, phosphate anions, and at least one adhesion promoter selected from (i) film-forming organic substances, (ii) polymers of vinyl phenols modified by substitution of substituted aminomethyl moieties on their aromatic rings, (iii) inorganic oxides of one of the elements silicon, aluminum, titanium, and zirconium. Preferably, the phosphating solution also contains manganese and nickel cations and either iron cations or hydroxylamine. If adhesion to paint is desired, the adhesion promoter preferably is an acrylic film-forming substance, while if adhesion to elastomers is desired, the adhesion promoter preferably is a polymer of vinyl phenol and the phosphating solution preferably also contains calcium cations.

2 Claims, No Drawings

US 6,743,302 B2

DRY-IN-PLACE ZINC PHOSPHATING COMPOSITIONS INCLUDING ADHESION-PROMOTING POLYMERS

CROSS-REFERENCE TO RELATED APPLICATIONS

Priority for this application is claimed under 35 U. S. C. §119(e) from application Ser. Nos. 60/245,694 filed Nov. 3, 2000 and 60/178,685 filed Jan. 28, 2000.

STATEMENT REGARDING FEDERALLY SPONSORED RESEARCH OR DEVELOPMENT

Not applicable.

BACKGROUND OF THE INVENTION

This invention relates to a generically well known process variously called "phosphating", "phosphatizing", or "phosphate conversion coating" in which a metallic substrate is coated with an adherent coating containing phosphate anions and metal cations, at least some of these metal cations being those corresponding to one or more metallic constituent(s) of the substrate. If the phosphating composition also contains divalent cations that can form only sparingly water-soluble phosphates, the conversion coating formed also normally includes some of these divalent cations from the phosphating composition.

Normally, a phosphate coating is formed by chemical reaction between the metal substrate and an aqueous liquid variously called a "phosphating" or "phosphatizing" composition, solution, bath, or a like term; in some instances, the formation of the coating may be aided by, or even completely dependent on, application of an electric current. If the phosphating composition is in contact with the substrate for at least about five seconds at a temperature not more than 70° C. and any liquid phosphating composition remaining in contact with the conversion coating thus formed is rinsed off before the substrate treated with it is dried, the phosphate coating formed generally is microcrystal line, particularly if the substrate and/or the phosphating composition contains substantial amounts of iron and/or zinc. If the phosphating composition is applied to the substrate and dried in place without rinsing, the coating formed is usually predominantly amorphous.

The presence of a phosphate coating on a metal substrate normally serves one or both of two major functions: (1) increasing the corrosion resistance of the substrate by comparison with an otherwise identical metal substrate that has no such conversion coating, an increase that may be measured either with or without a subsequent paint or similar protective coating and (2) serving as a strongly adherent "carrier" for an externally applied lubricant material that facilitates mechanical cold working.

A major object of this invention is to achieve an additional benefit from a phosphate conversion coating in an operation of the former type when the phosphating composition is dried into place without rinsing. The specific benefit achieved is improved adhesion to subsequently applied paint, elastomers, sealants, and like coatings and adhered structural members, particularly when the conversion coated object that has been painted or adhered to an elastomeric and/or sealant type structural member is to be mechanically deformed after having been thus painted or adhered. (A "sealant" may be defined for purposes of this description as an elastomeric material that serves at least one of the uses of (i) forming a load-bearing joint, (ii) excluding dust, dirt, moisture, and other chemicals that include a liquid or gas, (iii) reducing noise and vibrations, (iv) insulating, and (v) filling spaces). Other more detailed objects of the invention will become apparent from the description below.

Except in the claims and the operating examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred, however. Also, throughout the description, unless expressly stated to the contrary: percent, "parts of", and ratio values are by weight or mass; the term "polymer" includes "oligomer", "copolymer", "terpolymer" and the like; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description or of generation in situ within the composition by chemical reaction(s) noted in the specification between one or more newly added constituents and one or more constituents already present in the composition when the other constituents are added, and does not preclude unspecified chemical interactions among the constituents of a mixture once mixed; specification of constituents in ionic form additionally implies the presence of sufficient counterions to produce electrical neutrality for the composition as a whole and for any substance added to the composition; any counterions thus implicitly specified preferably are selected from among other constituents explicitly specified in ionic form, to the extent possible; otherwise such counterions may be freely selected, except for avoiding counterions that act adversely to an object of the invention; the word "mole" means "gram mole", and the word itself and all of its grammatical variations may be used for any chemical species defined by all of the types and numbers of atoms present in it, irrespective of whether the species is ionic, neutral, unstable, hypothetical, or in fact a stable neutral substance with well defined molecules; an abbreviation once defined may be used thereafter with either exactly the same meaning or a grammatically varied meaning as indicated by the context and is to be understood as having the same meaning, Mutatis mutandis, as when first defined; the term "paint" and its grammatical variations are to be understood as including any material or process that may be known by a more specialized term, such as "enamel", "varnish", "lacquer", "shellac", "electropaint", "top coat", "clear coat", "color coat", "autodeposited coating", "radiation curable coating", "siccative coating", and the like and their grammatical variations; and the terms "solution", "soluble", "homogeneous", and the like are to be understood as including not only true equilibrium solutions or homogeneity but also dispersions that show no visually detectable tendency toward phase separation over a period of observation of at least 100, or preferably at least 1000, hours during which the material is mechanically undisturbed and the temperature of the material is maintained within the range of 18–25° C.

BRIEF SUMMARY OF THE INVENTION

It has been found that the above stated object of the invention can be achieved by combining an adhesion-promoting substance with a conventional liquid phosphating composition. Specific embodiments of the invention include phosphating compositions containing one or more types of adhesion-promoting substances; processes for forming a phosphate conversion coating on a metal substrate by forming a liquid coating of an aqueous solution containing ingredients of a conventional phosphating composition and an adhesion-promoting substance over the metal substrate, and then drying the liquid layer in place on the metal substrate, without rinsing off any of the liquid layer with additional water and without any need for application of electromotive force from an external source; articles of manufacture including surfaces treated by such a process; and/or surfaces having a phosphate conversion coating that includes an adhesion-promoting substance and/or a product formed by drying an adhesion-promoting substance.

DETAILED DESCRIPTION OF THE INVENTION AND PREFERRED EMBODIMENTS

Non-exclusive examples of conventional phosphating compositions suitable for combining with at least one film-forming organic substance to produce a composition according to this invention include those described in the following U.S. Patents and applications therefor, the entire disclosures of which, except to any extent that they may be inconsistent with any explicit statement herein or with other more recently developed knowledge in the art, are hereby incorporated herein by reference: U.S. National application Ser. Nos. 08/344,829; 08/464,609; 08/569,177, now abandoned; 08/638,268, now abandoned; 60/036,606, now abandoned; and 08/849,704, now abandoned; PCT Application Nos. US96/19144; and US96/02677; and U.S. Pat. Nos. 5,900,073; 5,891,268; 5,776,265; 5,645,650; 5,683,816; 5595,611; 5,498,300; 5,472,522; 5,451,271; 5,378,292; 5,261,973; 5,143,552; 5,125,989; 5,082,511; 5,073,196; 5.045,130; 5,000,799; 4,992,116; 4,961,794; 4,927,472; 4,880,467; 4,874,480; 4,849,031; 4,722,753; 4,717,431; 4,673,444; 4,643,778; 4,639,295; 4,637,838; 4,612,060; 4,596,607; 4,595,424; 4,565,585; 4,559,087; 4,539,051; 4,529,451; 4,517,029; 4,515,643; 4,486,241; 4,443,273; 4,419,199; 4,419,147; 4,416,705; 4,402,765; 4,385,096; 4,377,487; 4,338,141; 4,311,535; 4,292,096; 4,289,546; 4,265,677; 4,220,486; 4,142,917; 4,108,690; 4,063,968; 3,939,014; 3,932,287; 3,870,573; 3,860,455; 3,850,700; 3,839,099; 3,795,548; 3,758,349; 3,723,334; 3,723,192; 3,706,604; 3,697,332; 3,671,332; 3,645,797; 3,619,300; 3,615,912; 3,607,453; 3,573,997; 3,565,699; 3,547,711; 3,533,859; 3,525,651; 3,519,495; 3,519,494; 3,516,875; 3,515,600; 3,493,400; 3,484,304; Re 27,896; 3,467,589; 3,454,483; 3,450,579; 3,450,578; 3,450,577; 3,449,222; 3,444,007; 3,401,065; 3,397,093; 3,397,092; 3,380,859; 3,338,755; 3,297,493; 3,294,593; 3,268,367; 3,240,633; 3,218,200; 3.197,344; 3,161,549; 3,154,438; 3,146,133; 3,133,005; 3,101,286; 3,046,165; 3,015,594; 3,007,817; 2,979,430; 2,891,884; 2,882,189; 2,875,111; 2,840,498; 2,835,618; 2,835,617; 2,832,707; 2,819,193; 2,813,814; 2,813,813; 2,813,812; 2,798,829; 2,758,949; 2,744,555; 2,743,204; 2,724,668; 2,702,768; 2,665,231; 2,657,156; 2,609,308; 2,591,479; 2,564,864; 2,540,314; 2,298,312; 2,298,280; 2,245,609; 2,132,883; 2,121,574; 2,121,520; 2,120,212; 2,114,151; 2,076,869; 1,660,661; 1,654,716; 1,651,694; 1,639,694; 1,610,362; 1,485,025; 1.388,325; 1,377,174; 1,341,100; 1,320,734; 1,317,351; 1,292,352; 1,290,476; 1,287,605; 1,254,264; 1,254,263; 1,248,053; 1,219,526; 1,215,463; and 1,206,075.

Because a liquid composition according to this invention is applied by the dry-in-place method, the concentration of the various ingredients in it has relatively little effect by itself on the quality of the protection obtained, which instead depends more on the total amount of the active ingredients put into place on each unit area of the surface, the ratios among the active ingredients, and the time and temperature of drying. Accordingly, the preferred concentrations will be described below primarily in terms of ratios between ingredients. However, preferred concentrations in working compositions are given for one ingredient; these preferences are primarily for practical convenience in supplying the desired total amounts of the active, non-volatile ingredients of the compositions.

A composition according to the invention must contain phosphate anions. They may be supplied to the composition by any oxyacid of phosphorus, or water-soluble salt thereof, in which the phosphorus is in its +5 valence state, i.e., orthophosphoric acid, metaphosphoric acid, and the condensed phosphoric acids corresponding to the general formula $H_{(n+2)}P_nO_{(3n+1)}$, where n represents a positive integer with a value of at least 2. As is generally known in the art, these species are all believed to exist in equilibrium with one another, with the equilibrium strongly favoring orthophosphoric acid and/or its salts at low temperatures and concentrations and favoring the more condensed acids, including metaphosphoric acid, and/or their salts at higher temperatures and concentrations. At least for reasons of economy, simple orthophosphoric acid, for which the chemical formula is $H_3PO_4$, and/or at least one salt thereof, is normally preferred as the source for the phosphate ions in a composition according to this invention. The concentration of phosphate ions in a working composition according to the invention, measured as its stoichiometric equivalent as orthophosphoric acid, preferably is at least, with increasing preference in the order given, 1.0, 2.0, 4, 6, 8, 11, 15, 20, 25, 30, 33, 36, 39, 41, 44, 47, 50, 53, 56, or 58 grams of orthophosphoric acid per liter of total working composition, a concentration unit that may be used hereinafter for any other constituent as well as for orthophosphoric acid and is hereinafter usually abbreviated as "g/l", and, if the working composition according to the invention is to be used to form a phosphate coating to be adhered to an elastomer, this concentration of phosphate ions in a working composition according to the invention, measured as its stoichiometric equivalent as orthophosphoric acid, more preferably is at least, with increasing preference in the order given, 70, 80, 90, 100, 110, 120, 130, 140, 145, 150, 155, or 160 g/l. Independently, at least for economy, this concentration of phosphate ions in a working composition according to the invention, measured as its stoichiometric equivalent as orthophosphoric acid, preferably is not more than, with increasing preference in the order given, 400, 200, 190, 185, 180, 175, 170, or 165, g/l, and, unless the working composition according to the invention is being used to form a coating to be bonded to an elastomer, this concentration more preferably is not more than, with increasing preference in the order given, 140, 130, 120, 110, 105, 100, 95, 90, 85, 80, 75, 70, 65, or 60 g/l. In deciding whether a composition conforms to one of these preferences, the stoichiometric equivalent as orthophosphoric acid of all sources of pentavalent phosphorus dissolved in a composition according to the invention is to be considered present as orthophosphoric acid, irrespective of the actual extent of ionization, complex formation, condensed phosphate formation, or the like.

A working composition according to the invention also contains zinc cations, which may be supplied to the composition by dissolving therein any suitable zinc salt or a combination of acid and elemental zinc, zinc oxide, or zinc hydroxide. If a substrate being coated is predominantly elemental zinc, an adequate and even a preferred amount of zinc can be dissolved into the working composition from the substrate before the working composition dries. Normally, however, in order to avoid substantial variations in coating quality, it is preferred to provide zinc cations in a controlled concentration to the working composition before the latter is contacted with the substrate to be coated. For convenience, freedom from contaminants that can cause quality problems in the coatings formed, and economy, either zinc oxide or zinc dihydrogen phosphate is preferred as a source of zinc ions for a composition according to this invention. The total zinc content of any source of zinc cations thus explicitly supplied to the composition is to be understood hereinafter to be present as zinc cations, irrespective of the actual degree of ionization, complex formation, ion association, or the like that may prevail in the actual working composition.

In a working composition according to the invention, the concentration in g/l of zinc cations preferably has a ratio to the concentration of phosphate ions, measured as their stoichiometric equivalent in g/l as orthophosphoric acid, that is at least, with increasing preference in the order given, 0.003:1.00, 0.005:1.00, 0.007:1.00, 0.010:1.00, or 0.013:1.00. If the working composition is used to form a coating to be painted, the ratio defined in the immediately preceding sentence more preferably is at least, with increasing preference in the order given, 0.015:1.00, 0.020:1.00, 0.025:1.00, 0.029:1.00, or 0.033:1.00. Independently, in any working composition according to the invention, the ratio as described in the two immediately preceding sentences preferably is not more than, with increasing preference in the order given, 0.10:1.00, 0.08:1.00, 0.06:1.00, 0.055:1.00, 0.050:1.00, 0.045:1.00, 0.040:1.00, or 0.035:1.00.

A composition according to the invention preferably contains manganese cations. The most preferred source for these manganese cations is manganous oxide, which dissolves in acidic aqueous solutions to supply manganese cations. Independently of the source of the manganese cations, their concentration in g/l in a composition according to the invention preferably has a ratio to the concentration of phosphate ions, measured as their stoichiometric equivalent in g/l as orthophosphoric acid in the same composition that is at least, with increasing preference in the order given, 0.01:1.00, 0.030:1.00, 0.040:1.00, 0.045:1.00, 0.050:1.00, 0.055:1.00, 0.060:1.00, 0.065:1.00, 0.070:1.00, or 0.075:1.00. If the composition according to the invention is to be used to form a coating to be painted, the same manganese:phosphate ratio as defined in the preceding sentence more preferably is at least, with increasing preference in the order given, 0.080:1.00, 0.085:1.00, 0.090:1.00, or 0.095:1.00. Independently, at least for economy, this same manganese:phosphate ratio as described in the two immediately preceding sentences preferably is not more than, with increasing preference in the order given, 0.7:1.00, 0.5:1.00, 0.3:1.00, 0.20:1.00, 0.18:1.00, 0.16:1.00, 0.14:1.00, 0.12:1.00, or 0.10:1.00.

Independently, a composition according to the invention preferably contains nickel cations, the preferred source of which is nickel phosphate. Independently of their particular source, the concentration in g/l of nickel cations in a composition according to the invention preferably has a ratio to the concentration of phosphate ions, measured as their stoichiometric equivalent in g/l as orthophosphoric acid in the same composition, that is at least, with increasing preference in the order given, 0.003:1.00, 0.005:1.00, 0.007:1.00, 0.010:1.00, 0.015:1.00, 0.020:1.00, or 0.025:1.00. If the coating formed by the working composition is painted, the same nickel:phosphate ratio as defined in the immediately preceding sentence more preferably is at least 0.029:1.00 and still more preferably is at least 0.032:1.00. Independently, at least for economy, this nickel:phosphate ratio as described in the two immediately preceding sentences preferably is not more than, with increasing preference in the order given, 0.10:1.00, 0.080:1.00, 0.075:1.00, 0.070:1.00, 0.065:1.00, 0.060:1.00, or 0.055:1.00, and if the coating formed by the working composition is painted, this same nickel:phosphate ratio is more preferably not more than, with increasing preference in the order given, 0.050:1.00, 0.045:1.00, 0.040:1.00, or 0.035:1.00.

Independently, a composition according to the invention preferably contains at least one of (i) hydroxylamine, in free or bound form and (ii) iron cations. Any iron cations present preferably are predominantly in the ferrous oxidation state, inasmuch as ferrous phosphate is considerably more water soluble than ferric phosphate. Any iron salt or oxide, or even iron metal (which will dissolve in acidic solutions, accompanied by hydrogen gas evolution) may be used as the source; ferrous sulfate is most preferred for convenience and economy. (Also, in a concentrate composition, the amounts of sulfate introduced into the composition by adding preferred amounts of iron as iron sulfate are believed to have a positive effect on the storage stability of the concentrate composition.) Independently of their source, the concentration of iron cations when these cations are present preferably has a ratio to the concentration of phosphate ions, measured as their stoichiometric equivalent as orthophosphoric acid, in the same composition, all of these concentrations being measured in g/l, that is at least, with increasing preference in the order given, 0.0003:1.00, 0.0005:1.00, 0.0007:1.00, 0.0010:1.00, 0.0015:1.00, 0.0020:1.00, 0.0025:1.00, 0.0029:1.00, or 0.0032:1.00 and independently preferably is not more than, with increasing preference in the order given, 0.010:1.00, 0.008:1.00, 0.006:1.00, 0.0055:1.00, 0.0050:1.00, 0.0045:1.00, 0.0040:1.00, or 0.0035:1.00.

Instead of iron cations, hydroxylamine may be used at least equally preferably, the hydroxylamine having been observed to be very stable even in concentrate compositions according to the invention when supplied as at least one of its salts with a strong acid. Oximes can also serve as a suitable source of hydroxylamine. Hydroxylamine sulfate is most preferred for economy and because, as already noted, sulfate is believed to contribute to the storage stability of highly concentrated compositions according to the invention. Irrespective of the specific source, when hydroxylamine is used in a working composition according to this invention, its concentration, measured as its stoichiometric equivalent as hydroxylamine, preferably has a ratio to the concentration of phosphate ions measured as their stoichiometric equivalent as orthophosphoric acid, all of these concentrations being measured in g/l, that is at least, with increasing preference in the order given, 0.0010:1.00, 0.0020:1.00, 0.0030:1.00, 0.0040:1.00, 0.0045:1.00, 0.0050:1.00, 0.0054:1.00, or 0.0056:1.00 and independently, at least for economy, preferably is not more than, with increasing preference in the order given, 0.08:1.00, 0.05:1.00, 0.03:1.00, 0.0100:1.00, 0.0090:1.00, 0.0080:1.00, 0.0070:1.00, 0.0065:1.00, 0.0060:1.00, or 0.0058:1.00.

A composition according to the invention may contain any of the additional divalent cations cobalt, magnesium, calcium, copper, and the like, often found useful in conventional phosphating compositions. Any of these additional divalent cations, except copper, when used preferably is present within one of the preferred concentration ranges indicated above for nickel. If copper is used, it preferably is present in a concentration that is, with increasing preference in the order given, from 3 to 100, 6 to 75, or 13 to 30 milligrams of copper per liter of total composition.

At least if a process according to the invention is producing a coating to be bonded to a sealant or elastomer, the working composition used in preferably contains calcium cations in a concentration that has a ratio to the concentration of phosphate ions, measured as their stoichiometric equivalent as orthophosphoric acid, all of these concentrations being measured in g/l, that is at least, with increasing preference in the order given, 0.007:1.00, 0.010:1.00, 0.015:1.00, 0.020:1.00, 0.025:1.00, 0.030:1.00, 0.035:1.00, 0.040:1.00, 0.044:1.00, or 0.048:1.00 and independently preferably, at least for economy, is not more than, with increasing preference in the order given, 0.30:1.00, 0.20:1.00, 0.15:1.00, 0.10:1.00, 0.090:1.00, 0.080:1.00, 0.075:1.00, 0.070:1.00, 0.065:1.00, 0.060:1.00, 0.055:1.00, or 0.050:1.00.

As with conventional phosphating practice, when the substrates to be treated are predominantly zinciferous or similarly electrochemically active, no accelerator is generally needed in the conventional phosphating composition part of a composition according to the invention, while if the substrates are predominantly ferriferous, an accelerator may be advantageous, although not strictly required because the treatment is by drying in place. Adequate guidance as to suitable accelerators is provided by the prior phosphating art. For example, a dissolved accelerator component may consist of at least one of: 0.3 to 4 g/l of chlorate ions; 0.01 to 0.2 g/l of m-nitrobenzene sulfonate ions; 0.05 to 2 g/l of m-nitrobenzoate ions; 0.05 to 2 g/l of p-nitrophenol; 0.005 to 0.15 g/l of hydrogen peroxide in free or bound form; 0.1 to 10 g/l of hydroxylamine in free or bound form; and 0.1 to 10 g/l of a reducing sugar.

In addition to the above-considered ingredients of a conventional phosphating composition, a composition according to the invention must include at least one adhesion-promoting substance, which preferably is selected from the group consisting of (i) film-forming organic substances, (ii) polymers of vinyl phenols modified by substitution of substituted aminomethyl moieties on the aromatic rings of the polymers of vinyl phenols, as described in more detail in one or more of U.S. Pat. Nos. 5,891,952, 5,298,289, 5,266,410, 5,068,299, and 5,063,089, the entire disclosures of all of which, except for any part that may be inconsistent with any explicit statement herein, are hereby incorporated herein by reference, this type of polymers being hereinafter denoted briefly as "amino-phenolic polymers" (these materials may be, but need not necessarily be, film-forming organic substances also), and (iii) inorganic oxides of one of the elements silicon, aluminum, titanium, and zirconium. A film-forming organic substance is defined for this purpose as an organic material that has all of the following properties:

when isolated from other materials, the film-forming organic substance is a solid at 30° C. and normal atmospheric pressure;

the film-forming organic substance can be dissolved or stably dispersed in water to form a homogeneous solution in which the film-forming organic substance constitutes at least 5% of the homogeneous solution; and when a homogeneous solution of the film-forming organic substance in water that contains at least 0.10 cubic centimeters volume of the isolated film-forming organic substance is dried at a temperature of 30° C. in a walled container with a base area of 1.0 square centimeter and walls perpendicular to the base, there is formed in the base of said container a continuous solid article of the film-forming organic substance, said continuous solid article, after being separated from the container in which it was formed by drying, having sufficient cohesion to sustain its integrity against the force of natural gravity of the Earth.

Preferred film-forming organic substances for inclusion in a composition according to the invention used to form a phosphate coating to be painted are selected from the group consisting of synthetic polymers of monomers selected from the group consisting of acrylic and methacrylic acids, esters of acrylic and methacrylic acids, amides of acrylic and methacrylic acids, and nitrites of acrylic and methacrylic acids, this group being hereinafter denoted briefly as "acrylic polymers".

Acrylic polymers to be used as an adhesion promoting additive in this invention still more preferably have a "$T_{300}$" value, which is defined as the highest temperature at which an air-dried film of the polymer has a torsional modulus of at least 300 kilograms per square centimeter, that is at least, with increasing preference in the order given, 0, 5, 10, 15, 20, 25, 29, or 32° C. and independently preferably is not more than, with increasing preference in the order given, 100, 75, 60, 50, 45, 41, 37, or 34° C.

When a composition according to the invention contains a film-forming organic substance and/or at least one aminophenolic polymer and is used to form a conversion coating to be painted, the concentration of these organic adhesion-promoting substances in g/l (on a basis of ultimate solids after drying) preferably has a ratio to the stoichiometric equivalent concentration of orthophosphoric acid in the same composition, also measured in g/l, that is at least, with increasing preference in the order given, 0.10:1.00, 0.30:1.00, 0.50:1.00, 0.60:1.00, 0.65:1.00, 0.70:1.00, 0.75:1.00, or 0.80:1.00 and independently preferably, at least for economy, is not more than, with increasing preference in the order given, 5:1.00, 3.0:1.00, 2.5:1.00, 2.0:1.00, 1.5:1.00, or 1.2:1.00, or, if the organic adhesion-promoting substance is a film-forming organic substance, 1.0:1.00.

Preferred amino-phenolic polymers for use in a composition according to the invention used to form a coating to be painted have at least one of the following characteristics, each of which is preferred independently of the others, and more preferably have more than one of the following characteristics, the preference being greater the greater the number of the following preferences included in it, polymers conforming to all of these preferences thus being the most preferred:

if all of the substituents on the aromatic rings that are substituted aminomethyl moieties and all of the substituents on the oxygen atoms bonded directly to the aromatic rings were replaced by hydrogen, the resulting polymer would be a polymer of a vinyl phenol, most preferably 4-vinyl phenol, and this polymer would have a weight average molecular weight that is at least, with increasing preference in the order given, 300, 400, 500, 600, 700, 800, 900, or 1000 and independently preferably is not more than, with increasing preference in the order given, 20,000, 15,000, 10,000, 9000, 8000, 7000, 6000, 5000, 4000, 3000, or 2000;

the nitrogen atoms in the substituted aminomethyl substituents on aromatic rings of the polymer molecules are preferably bonded to three distinct carbon atoms each, or in other words the amino moieties are tertiary amino moieties, and are not amine oxides;

at least one of the moieties bonded to each nitrogen atom in the substituted aminomethyl substituents on the aromatic rings is a poly hydroxy alkyl moiety conforming to the general formula —$CH_2$—$(CHOH)_n$—$CH_2OH$, where n represents a positive integer, and the average value of n', which is defined as the ratio of the number of hydroxyl moieties in all substituted aminomethyl substituents in the component of amino-phenolic polymers to the number of nitrogen atoms in all substituted aminomethyl substituents in the component of amino-phenolic polymers, is not less than, with increasing preference in the order given, 1.0, 2.0, 3.0, 3.5, 4.0, 4.5, or 4.9 and independently preferably is not more than, with increasing preference in the order given, 11, 9.0, 8.0, 7.5, 7.0, 6.5, 6.0, 5.5, or 5.1;

at least one of the moieties bonded to each nitrogen atom in the substituted aminomethyl substituents on the aromatic rings is an unsubstituted alkyl moiety having a number of carbon atoms that is not greater than, with increasing preference in the order given, 4, 3, 2, or 1.

Among the inorganic adhesion-promoting substances, silica is most preferred because it is most readily available commercially in suitable particle sizes already stably dispersed. When the adhesion-promoting substance is inorganic, its concentration in a composition according to the invention preferably has a ratio to the concentration of phosphate ions, expressed as its stoichiometric equivalent as orthophosphoric acid, that is at least, with increasing preference in the order given, 0.003:1.00, 0.005:1.00, 0.007:1.00, 0.009:1.00, 0.011:1.00, 0.013:1.00, or 0.015:1.00 and independently preferably, at least for economy, is not more than, with increasing preference in the order given, 1.00:1.00, 0.80:1.00, 0.70:1.00, 0.60:1.00, 0.50:1.00, 0.45:1.00, 0.43:1.00, 0.41:1.00, 0.39:1.00, or 0.37:1.00.

When a composition according to this invention is used to form a coating to be bonded to an elastomer, amino-phenolic polymers are preferred over acrylate polymers and inorganic material for the adhesion promoting additive, and when amino-phenolic polymers are used, their concentration in g/l (on a basis of ultimate solids after drying) preferably has a ratio to the phosphate ions concentration, measured as its stoichiometric equivalent of orthophosphoric acid in the same composition, also measured in g/l, that is at least, with increasing preference in the order given, 0.0005:1.00, 0.0010:1.00, 0.0020:1.0, 0.0024:1.00, 0.0027:1.00, 0.0030:1.00, 0.0032:1.00, 0.0034:1.00, 0.0036:1.00, or 0.0038:1.00 and independently preferably, at least for economy, is not more than, with increasing preference in the order given, 5:1.00, 3.0:1.00, 1.0:1.00, 0.50:1.00, 0.25:1.00, 0.10:1.00, 0.050:1.00, 0.020:1.00, 0.015:1.00, 0.010:1.00, 0.0090:1.00, 0.0080:1.00, 0.0070:1.00, 0.0060:1.00, 0.0050:1.00, 0.0045:1.00, 0.0042:1.00, or 0.0040:1.00.

Preferred amino-phenolic polymers for use in a composition according to the invention used to form a coating to be adhered to elastomer have at least one of the following characteristics, each of which is preferred independently of the others, and more preferably have more than one of the following characteristics, the preference being greater the greater the number of the following preferences included in it, polymers conforming to all of these preferences thus being the most preferred:

if all of the substituents on the aromatic rings that are substituted aminomethyl moieties and all of the substituents on the oxygen atoms bonded directly to the aromatic rings were replaced by hydrogen, the resulting polymer would be a polymer of a vinyl phenol, most preferably 4-vinyl phenol, and this polymer would have a weight average molecular weight that is at least, with increasing preference in the order given, 300, 400, 500, 600, 700, 800, 900, or 1000 and independently preferably is not more than, with increasing preference in the order given, 20,000, 15,000, 10,000, 9000, 8000, 7000, 6000, 5000, 4000, 3000, or 2000;

the nitrogen atoms in the substituted aminomethyl substituents on aromatic rings of the polymer molecules are preferably bonded to three distinct carbon atoms each, or in other words the amino moieties are tertiary amino moieties, and are not amine oxides;

at least one of the moieties bonded to each nitrogen atom in the substituted aminomethyl substituents on the aromatic rings is a hydroxy, preferably a monohydroxy, alkyl moiety with a number of carbon atoms that preferably is at least two and independently preferably is not more than, with increasing preference in the order given, 6, 4, 3, or 2;

at least one of the moieties bonded to each nitrogen atom in the substituted aminomethyl substituents on the aromatic rings is an unsubstituted alkyl moiety having a number of carbon atoms that is not greater than, with increasing preference in the order given, 4, 3, 2, or 1.

A process according to this invention is performed by a dry-in-place method; i.e., a liquid layer of a composition according to the invention is formed over the substrate surface to be treated in the process and then dried into place without any intermediate rinsing, so that the entire non-volatiles content of the liquid layer initially formed, possibly modified by chemical reaction with the surface being treated, remains in place as the coating formed in a process according to the invention.

A working composition according to the invention may be applied to a metal work piece and dried thereon by any convenient method, several of which will be readily apparent to those skilled in the art. For example, coating the metal with a liquid film may be accomplished by immersing the surface in a container of the liquid composition, spraying the composition on the surface, coating the surface by passing it between upper and lower rollers with the lower roller immersed in a container of the liquid composition, and the like, or by a mixture of methods. Excessive amounts of the liquid composition that might otherwise remain on the surface prior to drying may be removed before drying by any convenient method, such as drainage under the influence of gravity, squeegees, passing between rolls, and the like. Drying also may be accomplished by any convenient method, such as forced hot air blowing, passage through a heated oven, infrared heating and the like.

For flat and particularly continuous flat workpieces such as sheet and coil stock, application by a roller set in any of several conventional arrangements, followed by drying in a separate stage, is generally preferred. The temperature during application of the liquid composition may be any temperature within the liquid range of the composition, although for convenience and economy in application by roller coating, normal room temperature, i.e., from 20–30° C., is usually preferred. In most instances for continuous processing of coils, rapid operation is favored, and in such instances the most preferred drying is by infrared radiative heating, to produce a peak metal temperature that is at least, with increasing preference in the order given, 20, 30, 40, 50, 60, or 66° C. and independently preferably is not more than, with increasing preference in the order given, 230, 220, 210, 200, 190, 180, or 177° C. If the process is forming a coating to be bonded to elastomer, the peak metal temperature still more preferably is not more than, with increasing preference in the order given, 150, 125, 120, 115, 110, 105, 100, or 95° C. Any other method of heating, for example a hot air oven, may be used, preferably to achieve the same peak metal temperature.

Alternatively, particularly if the shape of the substrate is not suitable for roll coating, a composition may be sprayed onto the surface of the substrate, which may optionally be preheated, and allowed to dry in place; such cycles can be repeated as often as needed until the desired amount of coating, generally measured in grams of coating per square meter of substrate surface coated (a unit of measurement hereinafter usually abbreviated as "g/m$^2$"), is achieved. For this type of operation, the same peak metal temperatures as specified in the immediately preceding paragraph are preferred.

The amount of dry add-on mass per unit area of substrate surface treated (often alternatively called "coating weight") in a process according to the invention preferably is at least, with increasing preference in the order given, 0.05, 0.10, 0.15, 0.20, 0.24, 0.26, 0.28, 0.30, or 0.32 g/m$^2$, or if the coating is to be adhered to elastomer still more preferably is at least, with increasing preference in the order given, 0.35, 0.40, 0.45, 0.50, or 0.53 g/m$^2$. Independently, at least for economy, this coating weight preferably is not more than, with increasing preference in the order given, 8, 6, 5.0, 4.0, 3.5, 3.0, 2.5, 2.0, 1.5, or 1.2, and if the coating formed is to be painted and particularly if the substrate is intended to receive another conversion coating after being mechanically shaped subsequent to a process according to the invention, this coating weight still more preferably is not more than, with increasing preference in the order given, 1.00, 0.90, or 0.85 g/m$^2$.

Preferably, a metal surface to be treated according to the invention is first cleaned of any contaminants, particularly organic contaminants and foreign metal fines and/or inclusions. Such cleaning may be accomplished by methods known to those skilled in the art and adapted to the particular type of metal substrate to be treated. For example, for galvanized steel surfaces, the substrate is most preferably cleaned with a conventional hot alkaline cleaner, then rinsed with hot water, squeegeed, and dried. For aluminum, the surface to be treated most preferably is first contacted with a conventional hot alkaline cleaner, then rinsed in hot water, then, optionally, contacted with a neutralizing acid rinse, before being contacted with a composition according to the invention as described above.

The invention may be further appreciated by consideration of the following working examples.

GROUP 1

The working compositions for these examples were made from one of two concentrates that contained the ingredients of a conventional phosphating liquid composition, and an adhesion-promoting additive was also mixed with this concentrate to make the working composition. In some instances, other ingredients were also used. The ingredients and amounts thereof in the two concentrate phosphating liquid compositions are shown in Table 1 below. In this table, the value shown for "H$_3$PO$_4$" is the stoichiometric equivalent as this substance from all pentavalent phosphorus sources in the working composition, and any balance not specified was deionized water.

TABLE 1

| | % of Ingredient in Concentrate Number: | |
|---|---|---|
| Ingredient {Source or Sources} | 1C | 2C |
| H$_3$PO$_4$ {from H$_3$PO$_4$ solution in water, Zn(H$_2$PO$_4$)$_2$ solution in water, and a nickel phosphate solution in water that contained 8.25% of Ni$^{+2}$ and 37.6% of PO$_4^{-3}$} | 40.6 | Not applicable |
| H$_3$PO$_4$ {from H$_3$PO$_4$ solution in water and a nickel phosphate solution in water that contained 8.25% of Ni$^{+2}$ and 37.6% of PO$_4^{-3}$} | Not applicable | 37.6 |
| Fe$^{+2}$ {from ferrous sulfate heptahydrate} | 0.15 | 0.12 |
| Zn$^{+2}$ {from zinc oxide} | Not applicable | 1.29 |
| Zn$^{+2}$ {from Zn(H$_2$PO$_4$)$_2$ solution in water} | 1.37 | Not applicable |
| Mn$^{+2}$ {from manganous oxide} | 3.95 | 3.55 |
| Ni$^{+2}$ {from a nickel phosphate solution in water that contained 8.25% of Ni$^{+2}$ and 37.6% of PO$_4^{-3}$} | 1.33 | 1.99 |
| Ca$^{+2}$ {from calcium carbonate} | None | 1.84 |

Candidate working compositions were made as shown in Table 2 below; the balance to 100 milliliters (hereinafter usually abbreviated as "ml") volume not shown in Table 2 was deionized water. The "Poly(acrylic acid) Solution" shown in a heading in Table 2 was ACCUMER™ 1510 poly(acrylic acid) solution, a commercial product of Rohm & Haas Co., and was reported by its supplier to be a colloidal solution in water of poly(acrylic acid) with a molecular weight of about 6×10$^4$ and a polymer solids content of 25%. The "Amino-Phenolic Polymer Solution" shown in a heading in Table 2 was made substantially in accordance with the teachings of Example 7 of U.S. Pat. No. 5,891,952. The "Polyacrylate Latex" shown in a heading in Table 2 was RHOPLEX™ HA-16 acrylic binder, commercially supplied by Rohm & Haas Co., and was reported by its supplier to be a dispersion of a nonionic, self-crosslinking acrylic polymer with a T$_{300}$ value of 33° C. and a polymer solids content of 45.5%. The "Colloidal Silica Dispersion" shown in a heading in Table 2 was CABOSPERSE A-205, a commercial product of Cabot Corp., and was reported by its supplier to contain 12% solids.

The candidate working compositions shown in Table 2 were all coated onto conventional hot-dip galvanized steel test panels, using a #3 Draw Bar to give a constant volume of liquid coating, which was then dried into place on the test panel surface at a temperature specified in Table 3 below. In order to determine the coating weight achieved, at least one of the thus coated panels for each variation of coating composition and drying temperature was rubbed with a cloth soaked with methyl ethyl ketone, allowed to dry, weighed, immersed in an ammonium dichromate solution and rubbed twice, then water-rinsed, again dried, and reweighed. The difference in weight was the weight of the entire coating, which was converted to "coating weight" by dividing by the area of the coating.

Other panels on which the dried into place phosphate coating formed was still intact were coated successively with AKZO™ 9×444 primer and a polyester top coat that was specified as being able to endure a "2T" bend with no cracking or peeling. Each panel was tested according to American Society for Testing and Materials Procedure D4145 "T-Bend" test successively in "0T", "1T", and "2T" bends, except that if the panel passed one of these tests, the remaining, less severe tests were not performed on the assumption that they would be passed. Results are shown in Table 3, where the entry "1" indicates that a thus painted panel failed 0T but passed the 1T test, the entry "2" indicates that the painted panel failed the 0T and 1T test but passed the 2T test and the entry "F" indicates that the panel failed the 2T test. (The entry "F" does not necessarily mean that the panel so treated is commercially unacceptable.)

In addition to the working compositions reported above, one more candidate working composition was prepared by mixing equal volumes of (i) Concentrate 2C (from Table 1), (ii) RHOPLEX™ HA-16 acrylic binder, (iii) 75% $H_3PO_4$ solution in water, and (iv) deionized water to make an intermediate concentrate, then preparing in additional deionized water a solution containing 11% by volume of said intermediate concentrate. This was applied to a substrate as described for the working compositions shown in Tables 2 and 3, except that a #12 rather than a #3 drawbar was used and the drying temperature was 218° C. instead of any of the values in Table 3. This substrate was painted with AKZO™ PMY 0154 primer followed by an AKZO™ FLUOPON™ top coating. This coated substrate passed a 0T bend test as described above with good adhesion.

TABLE 2

Amounts of Active Ingredients in the Working Composition

| Working Composition Number | Concentrate 1C, ml | Poly(acrylic acid) Solution, ml | Amino-Phenolic Polymer Solution | Polyacrylate Latex, ml | Colloidal Silica Dispersion, ml |
|---|---|---|---|---|---|
| 1 | 4.5 | 1.0 | None | None | None |
| 2 | 18 | 4.0 | None | None | None |
| 3 | 4.0 | 2.0 | None | None | None |
| 4 | 16 | 8.0 | None | None | None |
| 5 | 2.5 | 5.0 | None | None | None |
| 6 | 10 | 25 | None | None | None |
| 7 | 4.5 | None | 2.5 | None | None |
| 8 | 18 | None | 10 | None | None |
| 9 | 4.0 | None | 5.0 | None | None |
| 10 | 16 | None | 20 | None | None |
| 11 | 2.5 | None | 12.5 | None | None |
| 12 | 10 | None | 50 | None | None |
| 13 | 4.5 | None | None | 0.5 | None |
| 14 | 18 | None | None | 2.0 | None |
| 15 | 4.0 | None | None | 1.0 | None |
| 16 | 16 | None | None | 4.0 | None |
| 17 | 2.5 | None | None | 2.5 | None |
| 18 | 10 | None | None | 10 | None |
| 19 | 4.9 | None | None | None | 0.25 |
| 20 | 19.6 | None | None | None | 1.0 |
| 21 | 4.5 | None | None | None | 2.5 |
| 22 | 18 | None | None | None | 10 |
| 23 | 4.0 | None | None | None | 5.0 |
| 24 | 16 | None | None | None | 20 |

TABLE 3

| Coated Liquid Composition Number | Coating Weight, g/m² | Drying Temperature, ° C. | Bend Test Result |
|---|---|---|---|
| 1 | 0.32–0.43 | 66 | F |
| 1 | 0.32–0.43 | 121 | F |
| 1 | 0.32–0.43 | 177 | F |
| 1 | 1.6–2.2 | 66 | F |
| 1 | 1.6–2.2 | 121 | F |
| 2 | 1.6–2.2 | 177 | F |
| 3 | 0.32–0.43 | 66 | F |
| 3 | 0.32–0.43 | 121 | F |
| 3 | 0.32–0.43 | 177 | F |
| 4 | 1.6–2.2 | 66 | F |
| 4 | 1.6–2.2 | 121 | F |
| 4 | 1.6–2.2 | 177 | 2 |
| 5 | 0.32–0.43 | 66 | 1 |
| 5 | 0.32–0.43 | 121 | 1 |
| 5 | 0.32–0.43 | 177 | 1 |
| 6 | 1.6–2.2 | 66 | F |
| 6 | 1.6–2.2 | 121 | F |
| 6 | 1.6–2.2 | 177 | F |
| 7 | 0.32–0.43 | 66 | 2 |
| 7 | 0.32–0.43 | 121 | 2 |
| 7 | 0.32–0.43 | 177 | F |
| 8 | 1.6–2.2 | 66 | F |
| 8 | 1.6–2.2 | 121 | F |
| 8 | 1.6–2.2 | 177 | F |
| 9 | 0.32–0.43 | 66 | 1 |
| 9 | 0.32–0.43 | 121 | 2 |
| 9 | 0.32–0.43 | 177 | 2 |
| 10 | 1.6–2.2 | 66 | 1 |
| 10 | 1.6–2.2 | 121 | F |
| 10 | 1.6–2.2 | 177 | F |
| 11 | 0.32–0.43 | 66 | 1 |
| 11 | 0.32–0.43 | 121 | 2 |
| 11 | 0.32–0.43 | 177 | 1 |
| 12 | 1.6–2.2 | 66 | F |
| 12 | 1.6–2.2 | 121 | F |
| 12 | 1.6–2.2 | 177 | F |
| 13 | 0.32–0.43 | 66 | 2 |
| 13 | 0.32–0.43 | 121 | Not tested |
| 13 | 0.32–0.43 | 177 | 2 |
| 14 | 1.6–2.2 | 66 | Not tested |
| 14 | 1.6–2.2 | 121 | F |
| 14 | 1.6–2.2 | 177 | F |
| 15 | 0.32–0.43 | 66 | F |
| 15 | 0.32–0.43 | 121 | 2 |
| 15 | 0.32–0.43 | 177 | 2 |
| 16 | 1.6–2.2 | 66 | F |
| 16 | 1.6–2.2 | 121 | Not tested |
| 16 | 1.6–2.2 | 177 | F |
| 17 | 0.32–0.43 | 66 | 1 |
| 17 | 0.32–0.43 | 121 | 2 |
| 17 | 0.32–0.43 | 177 | 2 |
| 18 | 1.6–2.2 | 66 | 1 |
| 18 | 1.6–2.2 | 121 | 1 |
| 18 | 1.6–2.2 | 177 | 1 |
| 19 | 0.32–0.43 | 66 | 1 |
| 19 | 0.32–0.43 | 121 | 1 |
| 19 | 0.32–0.43 | 177 | 2 |
| 20 | 1.6–2.2 | 66 | 2 |
| 20 | 1.6–2.2 | 121 | 1 |
| 20 | 1.6–2.2 | 177 | F |
| 21 | 0.32–0.43 | 66 | Not tested |
| 21 | 0.32–0.43 | 121 | F |
| 21 | 0.32–0.43 | 177 | 2 |
| 22 | 1.6–2.2 | 66 | F |
| 22 | 1.6–2.2 | 121 | Not tested |
| 22 | 1.6–2.2 | 177 | Not tested |
| 23 | 0.32–0.43 | 66 | 2 |
| 23 | 0.32–0.43 | 121 | F |
| 23 | 0.32–0.43 | 177 | 2 |
| 24 | 1.6–2.2 | 66 | 1 |
| 24 | 1.6–2.2 | 121 | 2 |
| 24 | 1.6–2.2 | 177 | 2 |

GROUP 2

Conventional phosphating concentrate composition utilized to prepare working compositions for this Group had the ingredients shown in Table 4 below. The nickel dihydrogen phosphate solution shown as an ingredient contained 8.2% of $Ni^{+2}$ and 37.6% of $PO_4^{-3}$.

TABLE 4

| Ingredient | Grams of Ingredient in 1000 Grams of Concentrate Number: | | | |
|---|---|---|---|---|
| | 4.1 | 4.2 | 4.3 | 4.4 |
| 75% $H_3PO_4$ Solution in water | 377 | 440 | 440 | 377 |
| Ferrous Sulfate Heptahydrate | 5.9 | 5.9 | 5.9 | none |
| Hydroxylamine Sulfate | none | none | none | 2.0 |
| Zinc Oxide | 16.0 | 6.8 | 16.0 | 16.0 |
| Manganous Oxide | 46 | 46 | 46 | 46 |
| Nickel Dihydrogen Phosphate Solution in Water | 241 | 241 | 241 | 241 |
| Calcium Carbonate | 46 | 46 | 46 | 46 |
| Deionized Water | Balance in all of the concentrates | | | |

Working compositions according to the invention and comparison compositions were then prepared as shown in Table 5.

TABLE 5

| Ingredient | Milliliters of Ingredient Mixed to Make: | | | | | | |
|---|---|---|---|---|---|---|---|
| | Working Example Compositions According to the Invention Numbers: | | | | | Comparative Example Compositions Numbers | |
| | 5.1 | 5.2 | 5.3 | 5.4 | 5.5 | C5.1 | C5.2 |
| Concentrate Number 4.1 from Table 4 | none | 25 | 25 | none | none | none | 25 |
| Concentrate Number 4.2 from Table 4 | 25 | none | none | none | none | 25 | none |
| Concentrate Number 4.3 from Table 4 | none | none | none | 25 | none | none | none |
| Concentrate Number 4.4 from Table 4 | none | none | none | none | 25 | none | none |
| Amino-Phenolic Resin Polymer Solution Number PS1 | 5.0 | none | none | none | none | none | none |
| Amino-Phenolic Resin Polymer Solution Number PS2 | none | none | none | 15 | none | none | none |
| Amino-Phenolic Resin Polymer Solution Number PS3 | none | 6.0 | 15 | none | 5.0 | none | none |
| Deionized Water | 75 | 75 | 75 | 75 | 75 | 75 | 75 |

"Amino-Phenolic Resin Polymer Solution Number PS1" as listed in Table 5 was made substantially as described in column 11 lines 45 through 59 of U.S. Pat. No. 5,068,299, except that the proportions of ingredients were varied as follows: Propasol™ P propoxylated propane solvent, 241 parts; Resin M, 109 parts; N-methylglucamine, 179 parts mixed with 272 parts of deionized water; 37% formaldehyde solution, 74 parts; and final dilution with deionized water to give a mixture with 30% solids and a pH value of 9.8±0.2.

"Amino-Phenolic Resin Polymer Solution Number PS2" as listed in Table 5 was made substantially in accordance with Example 3 of U.S. Pat. No. 5,891,952.

"Amino-Phenolic Resin Polymer Solution Number PS3" as listed in Table 5 was made substantially in accordance with Example 1 of U.S. Pat. No. 5,891,952 except that the proportions of ingredients and one of the ingredients were varied as follows: first deionized water, 318 parts; sodium hydroxide, 4.2 parts; N-methyl ethanolamine, 29 parts; poly(4-hydroxystyrene), 48 parts; paraformaldehyde, 12.5 parts; second use of deionized water, 349 parts; 75% solution of phosphoric acid in water, 30 parts; 60% fluorotitanic acid, 3.0 parts; and third use of deionized water, 31 parts. The final polymer solution had a pH value of 5.0 and contained 10.6% non-volatiles after drying.

Each working example or comparison example composition shown in Table 5 was used to form a phosphate conversion coating with a dry coating weight from 0.54 to 1.8 $g/m^2$ on a galvanized steel substrate (Galvaneal™) surface by forming a coating of a corresponding liquid mass and then drying it, to reach a peak metal temperature of 66 to 93° C., into place over the galvanized surface. After cooling, the thus prepared dried surface was coated with a layer of TEROSTAT® 06-1245 viscous liquid sealant precursor (commercially available from Henkel Surface Technologies Div. of Henkel Corp., Oak Creek, Wis.) and cured by baking according to the sealant supplier's directions. The force required to peel the cured sealant from the coated substrate surface was then determined, and the adhesion rated accordingly. Results are shown in Table 6 below.

TABLE 6

| Working Composition Used | Adhesion Rating |
|---|---|
| 5.1 | Good to Very Good |
| 5.2 | Good |
| 5.3 | Very Good |
| 5.4 | Very Good |
| 5.5 | Very Good |
| C5.1 | Poor |
| C5.2 | Poor |

The invention claimed is:

1. A liquid composition of matter suitable for use as a dry-in-place phosphating composition for galvanized steel, said composition comprising water and the following dissolved components:
   (a) a concentration of from 53 to 400 g/l of phosphate ions, measured as their stoichiometric equivalent as orthophosphoric acid;
   (b) a concentration in g/l of zinc cations that has a ratio to said concentration of phosphate ions, measured in g/l as their stoichiometric equivalent as orthophosphoric acid in the liquid composition, that is from 0.005:1.0 to 0.035:1.00;
   (c) a concentration of manganese cations in g/l that has a ratio to the concentration of phosphate ions, measured as their stoichiometric equivalent in g/l as orthophosphoric acid, in the liquid composition that is from 0.050:1.00 to 0.15:1.00;
   (d) a concentration of nickel cations in g/l that has a ratio to the concentration of phosphate ions, measured as their stoichiometric equivalent in g/l as orthophosphoric acid in the liquid composition, that is at least 0.020:1.00;
   (e) at least one of:
      (i) a source of hydroxylamine with a stoichiometric equivalent as hydroxylamine that has a ratio to the concentration of phosphate ions measured as their stoichiometric equivalent as orthophosphoric acid, in the liquid composition, both of these concentrations being measured in g/l, that is from 0.0030:1.00 to 0.03:1.00; and (ii) iron cations in a concentration that has a ratio to the concentration of phosphate ions, measured as their stoichiometric equivalent as orthophosphoric acid, in the liquid composition, both of these concentrations being measured in g/l, that is from 0.0007:1.00 to 0010:1.00;

(f) a concentration of calcium cations that has a ratio to the concentration of phosphate ions, measured as their stoichiometric equivalent as orthophosphoric acid, in the liquid composition, both of these concentrations being measured in g/l, that is from 0.030:1.00 to 0.080:1.00; and (g) a concentration in g/l of amino-phenolic polymers that has a ratio to the phosphate ions concentration, measured in g/l as its stoichiometric equivalent of orthophosphoric acid, in the liquid composition that is from 0.0020:1.0 to 0.020:1.00, wherein said amino-phenolic polymers have all of the following characteristics:

(i) if all of the substituents on the aromatic rings that are substituted aminomethyl moieties and all of the substituents on the oxygen atoms bonded directly to the aromatic rings were replaced by hydrogen, the resulting polymer would be a polymer of a vinyl phenol with a weight average molecular weight that is from 300 to 10,000;

(ii) the nitrogen atoms in the substituted aminomethyl substituents on aromatic rings of the polymer molecules are bonded to three distinct carbon atoms each are not amine oxides;

(iii) at least one of the moieties bonded to each nitrogen atom in the substituted aminomethyl substituents on the aromatic rings is a hydroxyalkyl moiety with from 2 to 6 carbon atoms; and (iv) at least one of the moieties bonded to each nitrogen atom in the substituted aminomethyl substituents on the aromatic rings is an unsubstituted alkyl moiety having not more than 3 carbon atoms.

2. A liquid composition suitable for use as a dry-in-place phosphating composition for galvanized steel, said composition comprising water and the following dissolved components:

(a) a concentration of from 53 to 400 g/l of phosphate ions, measured as their stoichiometric equivalent as orthophosphoric acid;

(b) a concentration in g/l zinc cations that has a ratio to said concentration of phosphate ions, measured in g/l as their stoichiometric equivalent as orthophosphoric acid in the liquid composition, that is from 0.015:1.0 to 0.06:1.00;

(c) a concentration of manganese cations in g/l that has a ratio to the concentration of phosphate ions, measured as their stoichiometric equivalent in g/l as orthophosphoric acid, in the liquid composition that is from 0.050:1.00 to 0.15:1.00;

(d) a concentration of nickel cations in g/l that has a ratio to the concentration of phosphate ions, measured as their stoichiometric equivalent in g/l as orthophosphoric acid in the liquid composition, that is at least 0.020:1.00;

(e) at least one of:

(i) a source of hydroxylamine with a stoichiometric equivalent as hydroxylamine that has a ratio to the concentration of phosphate ions, measured as their stoichiometric equivalent as orthophosphoric acid, in the liquid composition, both of these concentrations being measured in g/l, that is from 0.0030:1.00 to 0.03:1.00: and (ii) iron cations in a concentration that has a ratio to the concentration of phosphate ions, measured as their stoichiometric equivalent as orthophosphoric acid, in the liquid composition, both of these concentrations being measured in g/l, that is from 0.0007:1.00 to 0.010:1.00, and (f) a concentration of g/l of film-forming acrylic polymers that has a ratio to the phosphate ions concentration measured in g/l as its stoichiometric equivalent of orthophosphoric acid in the liquid composition that is from 0.0020:1.0 to 0.020:1.00, wherein said acrylic polymers have all of the following characteristics:

(i) when isolated from other materials, the acrylic polymers are a solid at 30° C. and normal atmospheric pressure;

(ii) the acrylic polymers can be dissolved or stably dispersed in water to form a homogeneous solution in which the acrylic polymers constitute at least 5% of the homogeneous solution;

(iii) when a homogeneous solution of the acrylic polymers in water that contains at least 0.10 cubic centimeters volume of the isolated acrylic polymers are dried at a temperature of 30° C. in a walled container with a base area of 1.0 square centimeter and walls perpendicular to the base, there is formed in the base of said container a continuous solid article of the acrylic polymers, said continuous solid article, after being separated from the container in which it was formed by drying, having sufficient cohesion to sustain its integrity against the force of natural gravity of the Earth; and (iv) has a $T_{300}$ value that is from 15 to 50°C.

* * * * *